United States Patent Office 3,577,356
Patented May 4, 1971

3,577,356
HIGHLY FLUORINATED POLYMERS
Floyd D. Trischler and Jerome Hollander, San Diego, Calif., assignors to Whittaker Corporation, Los Angeles, Calif.
No Drawing. Filed Feb. 23, 1968, Ser. No. 707,440
Int. Cl. C08g 23/00, 33/00
U.S. Cl. 260—2
7 Claims

ABSTRACT OF THE DISCLOSURE

This patent describes novel hydroxy containing polyethers which are prepared by the base polymerization of 2-hydro-perhaloisopropyl alcohols having the formula

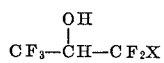

wherein X is fluorine, chlorine, bromine or iodine.

BACKGROUND OF THE INVENTION

Heretofore various polyethers have been proposed. However, the available polyethers are either characterized by relatively poor chemical and thermal stability or, in the case of the fluorinated polyethers, the fluorination is present primarily in the main backbone of the polyether rather than on side chains. There are various advantages to having the fluorine in the polyether present in the side chains pending therefrom. The present invention is, therefore, concerned with the preparation of a novel class of polyether containing pendant perfluorinated groups thereon.

SUMMARY OF THE INVENTION

Briefly, the present invention comprises novel highly fluorinated hydroxy containing polyethers prepared by the base catalyzed polymerization of 2-hydro-perhaloisopropyl alcohols such as chloropentafluoroisopropyl alcohol and hexafluoroisopropyl alcohol.

Accordingly, it is a principal object of the present invention to provide a novel class of highly fluorinated hydroxy containing polyethers.

Another object of the present invention is to provide a novel means of preparing novel hydroxy containing highly fluorinated polyethers.

These and other objects and advantages of the present invention will become apparent from the more detailed description which follows.

DESCRIPTION OF THE PREFERRED EMBODIMENTS

The polymers of the present invention are made from 2-hydro-perhaloisopropyl alcohol. The conversion to the polyether is promoted by any base containing an $OH^{\ominus}$, or an $OR^{\ominus}$ group therein. The polymers of the present invention can, if desired, be rendered insoluble or infusible by the application of heat or by chemical reaction with amines and other cross-linking and curing agents.

The reaction is preferably carried out in an inert organic solvent (water or organic solvents containing hydroxyl or amino groups preferably are not used). Particular solvents used are diethyl ether and tetrahydrofuran. The reaction is most likely run at temperatures from about 0° C. to about 70° C. with the preferred temperature being between 23° C. to 66° C.

The following examples are presented solely to illustrate the invention and should not be regarded as limiting in any way. In the examples, the parts and percentages are by weight unless otherwise indicated.

EXAMPLE 1

Chloropentafluoroisopropyl alcohol (9.25 g., 0.05 mole), the monosodium salt of hexafluoropentanediol (11.7 g., 0.05 mole) and tetrahydrofuran (60 ml.) were mixed for 18 hours at room temperature under nitrogen, followed by 8 hours at 60° C. to 65° C. The slurry was cooled and concentrated hydrochloric acid (4 ml., 0.05 mole) was added. The slurry was filtered and the filtrate dried with magnesium sulfate. The solvent was removed and the residue dried in a vacuum oven at 110° C. for 4 hours. The polymer was ground in Dry Ice and washed with water to remove the last traces of hexafluoropentanediol. The polymer was redried at 110° C. in a vacuum oven overnight. The yield of polymer, which was extremely flexible and resembled crepe rubber, was 4.7 g. (63½%). The polymer was elastic and did not melt or discolor to 300° C. It contained 27% carbon, 1.2% hydrogen and 57% fluorine. In the infrared spectrum, the polymer had absorptions at $3.0\mu$ (w.), $3.5\mu$ (w.), $5.75\mu$ (m.), $7.35\mu$ (s.), 8 to $9\mu$ (s.), $11.25\mu$ (m.), and $14.35\mu$ (m.).

EXAMPLE 2

A heat cured polymer was made as follows:
Chloropentafluoroisopropyl alcohol (37.0 g., 0.2 mole), the monosodium salt of hexafluoropentanediol (46.8 g., 0.2 mole) and 150 ml. of tetrahydrofuran were mixed at 60° C. to 70° C. for 18 hours. After workup, the liquid polymer had a molecular weight of 3800. It contained 25% carbon, 2.3% hydrogen and 52% fluorine. It was soluble in methyl ethyl ketone and dimethylformamide. This polymer was then heated to 100° C. over a ½-hour period with water evolution, then to 140° C. over a ½-hour period at which time the material gelled. It was insoluble in all solvents and contained 57% fluorine, 27% carbon, and 1.2% hydrogen.

EXAMPLE 3

Lower molecular weight liquid polymer of this type can be crosslinked by amines such as triethylenetetramine. The liquid polymer is prepared as follows:

Chloropentafluoroisopropyl alcohol (9.3 g., 0.05 mole), sodium hydroxide (2.4 g., 0.06 mole) and ether were mixed for 19 hours at 25° C to 35° C. After purification, 4.5 g. (61% yield) of a very viscous polymer was obtained which had a molecular weight of 7850. Approximately 2 g. of this polymer was mixed with 3 drops of triethylenetetramine. The polymer gelled immediately to yield an elastic infusible polymer.

EXAMPLE 4

A slurry was made by vigorously stirring sodium hydroxide pellets (2.0 g., 0.05 mole) and sodium dried THF (20 ml.). Hexafluoroisopropyl alcohol (8.3 g., 0.05 mole) dissolved in THF (15 ml.) was added over a period of 10 minutes. The reaction was run at room temperature for 16 hours during which a white precipitate formed. The solution was dried over magnesium sulfate. After filtration, the THF was stripped from the solution and 6.5 g. of light yellow polymer isolated which was washed twice with hot water and dried. The molecular weight was determined to be 1600 (by VPO). The polymer contained 19.73% carbon, 0.69% hydrogen and 53.79% fluorine.

EXAMPLE 5

A heat cured polymer was made as follows: Hexafluoroisopropyl alcohol (33.6 g., 0.2 mole), pulverized sodium hydroxide (8.0 g., 0.2 mole) and 130 ml. of THF were mixed overnight at 60°–65° C. The THF was then removed and the residue washed with water, and dried in a vacuum oven at 60° C. for 6 hours. The resultant polymer was a light tan semisolid having a melting point of 73°–78° C., with apparent water evolution at 115°–120° C. The yield of the polymer was 14.0 g. (47.3%)

Sodium hydroxide and sodium salt of hexafluoropentanediol catalysts are shown in the examples. Additional catalysts include the other alkali hydroxides such as LiOH and KOH, other alkoxides, such as sodium methoxide, potassium ethoxide, lithium t-butoxide, and other mono-salt of glycols, such as the monosodium salt of ethylene glycol.

As is apparent from the foregoing examples, the novel fluorinated hydroxy containing polyethers of the present invention are capable of being converted by the use of crosslinking agents, specifically amines, to form polymers. In some cases, these polymers are elastic and infusible in which case they are useful for the making of any of the molded and cast shapes and objects which other elastic infusible polymers have been used for in the past.

Specifically, the polyethers of this invention can be utilized as follows.

(1) Molded shapes could be made by pressure molding the crosslinked (cured) polymer using heat and pressure.

(2) Molded shapes could be made by pouring liquid polymer into a mold and heat cure.

(3) Laminates could be made by impregnating the fiber reinforcement with the liquid polymer, then setting up and curing the laminates.

(4) Coatings can be made on substrates such as metals, paper, and fabrics. This can be done by dissolving the soluble polymer (either liquid or slightly cured rubbery polymer) in a solvent such as THF, using this solution to coat the substrate, then heat drying it. Coating paper or previously untreated cotton cloth with this polymer imparts water repellency to the substrate. The cloth is directly usable in garment manufacture.

(5) The polyether, after crosslinking to an infusible solid, is fire retardant.

We claim:
1. The method of preparing hydroxy containing fluorinated polyethers which comprises polymerizing in an inert organic solvent at a temperature within the range of about 0° C. to about 70° C. 2-hydro-perhalo-isopropyl alcohols of the structure

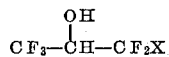

in which X is selected from the group consisting of fluorine, chlorine, bromine and iodine in the presence of a base.

2. The method of claim 1 wherein the base is an alkali metal hydroxide.

3. The method of claim 1 wherein the base is a mono-alkali salt of a glycol.

4. The method of claim 1 wherein X is chlorine.

5. The method of claim 1 wherein X is fluorine.

6. The method of claim 1 in which said polymerization temperature is within the range of about 23° C. to about 66° C.

7. The method of claim 1 in which said inert organic solvent is selected from the group consisting of tetrahydrofuran and diethyl ether.

References Cited
UNITED STATES PATENTS

| 3,322,826 | 5/1967 | Moore | 260—2 |
| 3,342,875 | 9/1967 | Selman et al. | 260—615 |
| 3,393,158 | 7/1968 | Warnell | 260—2 |

FOREIGN PATENTS

| 620,036 | 5/1961 | Canada | 260—2 |

OTHER REFERENCES

Smith et al., "Industrial and Engineering Chemistry," vol. 49 (1957), pp. 1241–6.

SAMUEL H. BLECH, Primary Examiner

U.S. Cl. X.R.

117—135.5, 155, 161; 260—30.4, 32.6, 32.8